US009046177B2

(12) United States Patent
Tell

(10) Patent No.: US 9,046,177 B2
(45) Date of Patent: Jun. 2, 2015

(54) INSERT FOR BELLOWS WITH NON-LINEAR COMPRESSION / EXPANSION IN A VACUUM POWERED TOOL

(71) Applicant: XEREX AB, Taby (SE)

(72) Inventor: Peter Tell, Akersberga (SE)

(73) Assignee: XEREX AB, Taby (SE)

( * ) Notice: Subject to any disclaimer, the term of this patent is extended or adjusted under 35 U.S.C. 154(b) by 0 days.

(21) Appl. No.: 14/241,180

(22) PCT Filed: Sep. 20, 2012

(86) PCT No.: PCT/SE2012/050994
§ 371 (c)(1),
(2) Date: Feb. 26, 2014

(87) PCT Pub. No.: WO2013/062463
PCT Pub. Date: May 2, 2013

(65) Prior Publication Data
US 2014/0360358 A1 Dec. 11, 2014

(51) Int. Cl.
| B25J 15/06 | (2006.01) |
| F16J 3/06 | (2006.01) |
| B25J 15/00 | (2006.01) |
| B25J 15/12 | (2006.01) |
| B25J 15/04 | (2006.01) |
| F16J 3/04 | (2006.01) |
| F16D 3/84 | (2006.01) |

(52) U.S. Cl.
CPC ............... *F16J 3/06* (2013.01); *B25J 15/0023* (2013.01); *B25J 15/12* (2013.01); *F16D 3/845* (2013.01); *B25J 15/0475* (2013.01); *F16J 3/043* (2013.01)

(58) Field of Classification Search
CPC ............... B25J 15/0433; B25J 15/0441; B25J 15/0475; B25J 15/12; B25J 15/0023; B25J 15/0616; F16J 3/06; F16J 3/043; H01L 21/6838; B65G 47/91
USPC ............................ 294/183–185, 99.1; 901/40
See application file for complete search history.

(56) References Cited

U.S. PATENT DOCUMENTS

| 3,743,340 A | 7/1973 | Williamann |
| 3,901,502 A | 8/1975 | Vits |

(Continued)

FOREIGN PATENT DOCUMENTS

| FR | 1474799 | 3/1967 |
| JP | 51119467 | 9/1976 |
| JP | 10249773 | 9/1998 |

(Continued)

OTHER PUBLICATIONS

International Search Report dated Feb. 6, 2013, corresponding to PCT/SE2012/050994.

*Primary Examiner* — Saul Rodriguez
*Assistant Examiner* — Gabriela Puig
(74) *Attorney, Agent, or Firm* — Young & Thompson

(57) ABSTRACT

A bellows insert (25) is shown, mountable inside a bellows for a vacuum powered tool and, in the mounted position, effective to locally limit the capacity of the bellows of compression in its longitudinal direction caused by a negative pressure introduced into the bellows. The bellows insert includes an engagement part (26) that has a shape complementary to the inside of the bellows and that, in the mounted position of the bellows insert, fills up some or all of the pleats of the bellows, within a limited area of the circumference of the bellows.

10 Claims, 4 Drawing Sheets

(56) References Cited

U.S. PATENT DOCUMENTS

| | | | |
|---|---|---|---|
| 3,934,916 A | | 1/1976 | Baker |
| 4,589,648 A | | 5/1986 | Hancock |
| 4,702,483 A | * | 10/1987 | Ukai et al. .................... 277/636 |
| 4,957,469 A | * | 9/1990 | Zollinger ...................... 464/175 |
| 5,295,914 A | * | 3/1994 | Milavec ........................ 464/175 |

FOREIGN PATENT DOCUMENTS

| | | |
|---|---|---|
| JP | 10249775 | 9/1998 |
| WO | 2010110719 | 9/2010 |

* cited by examiner

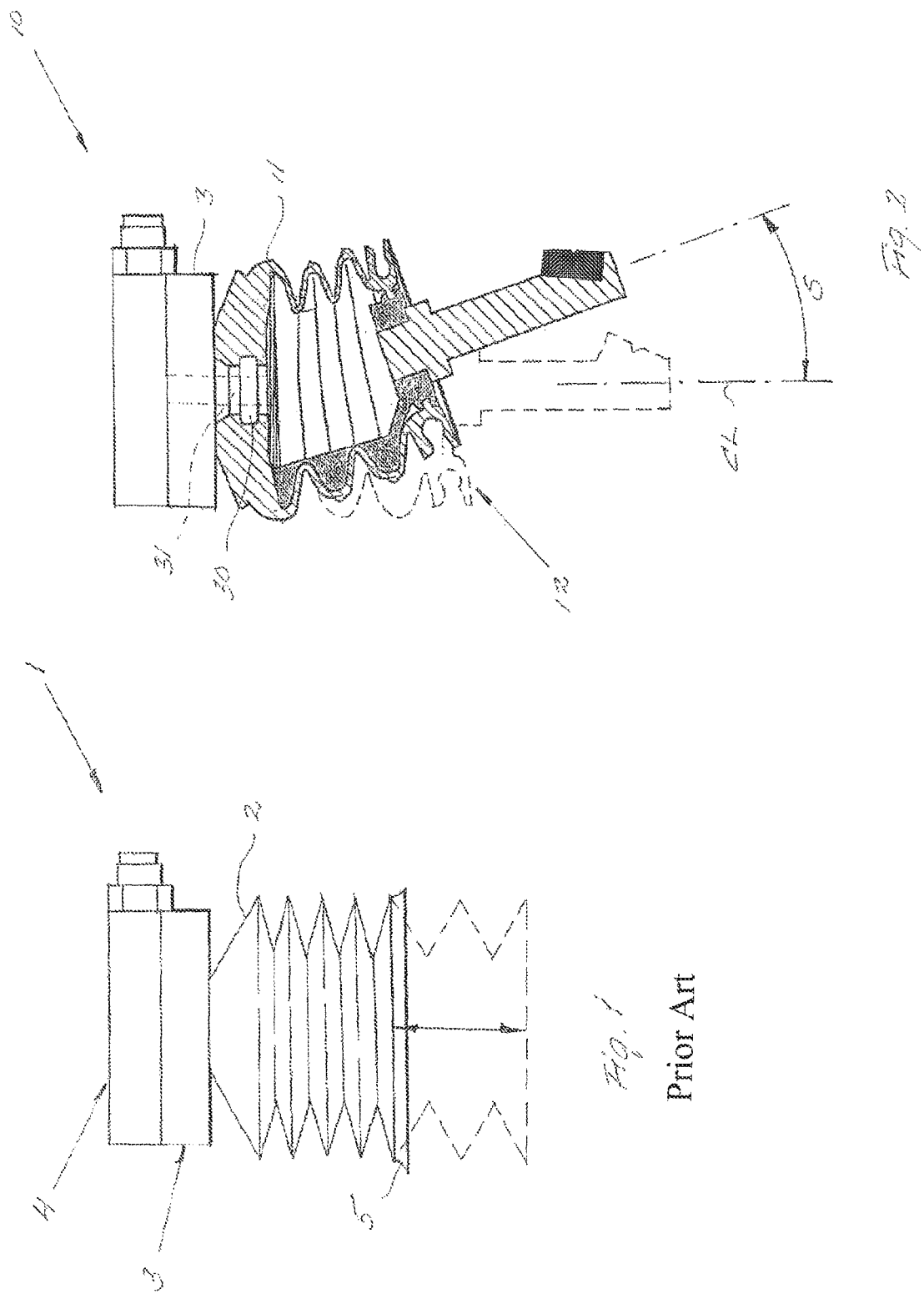

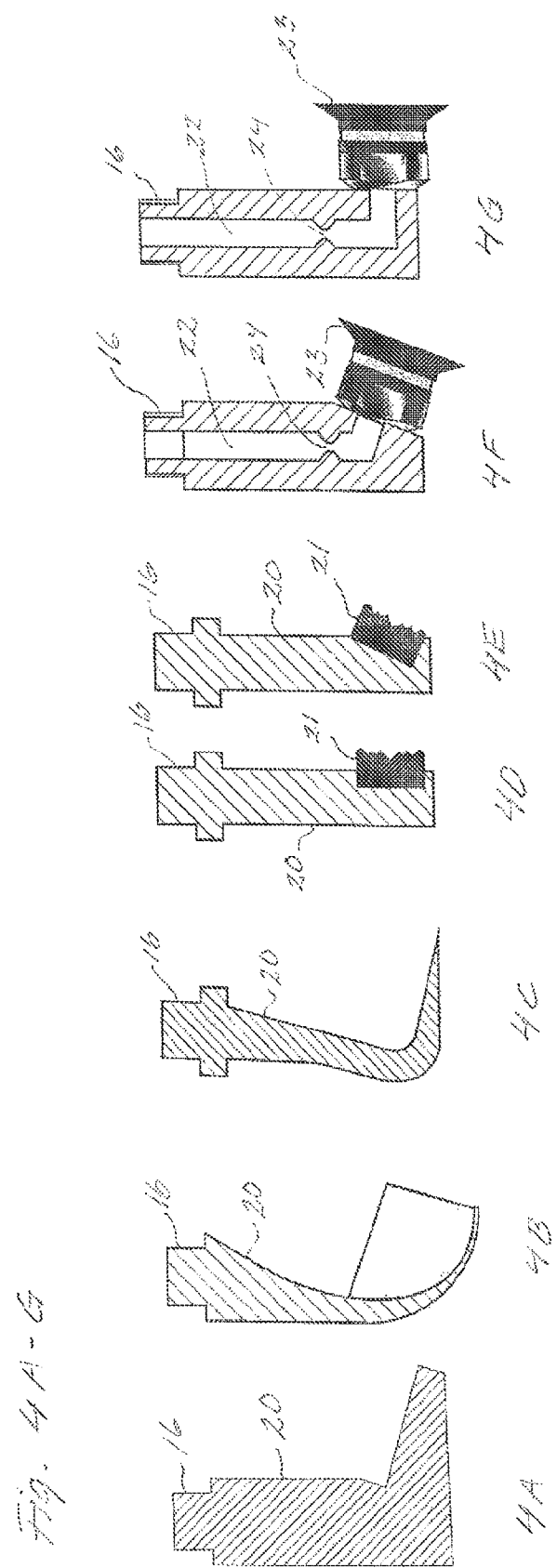
Fig. 4A-G

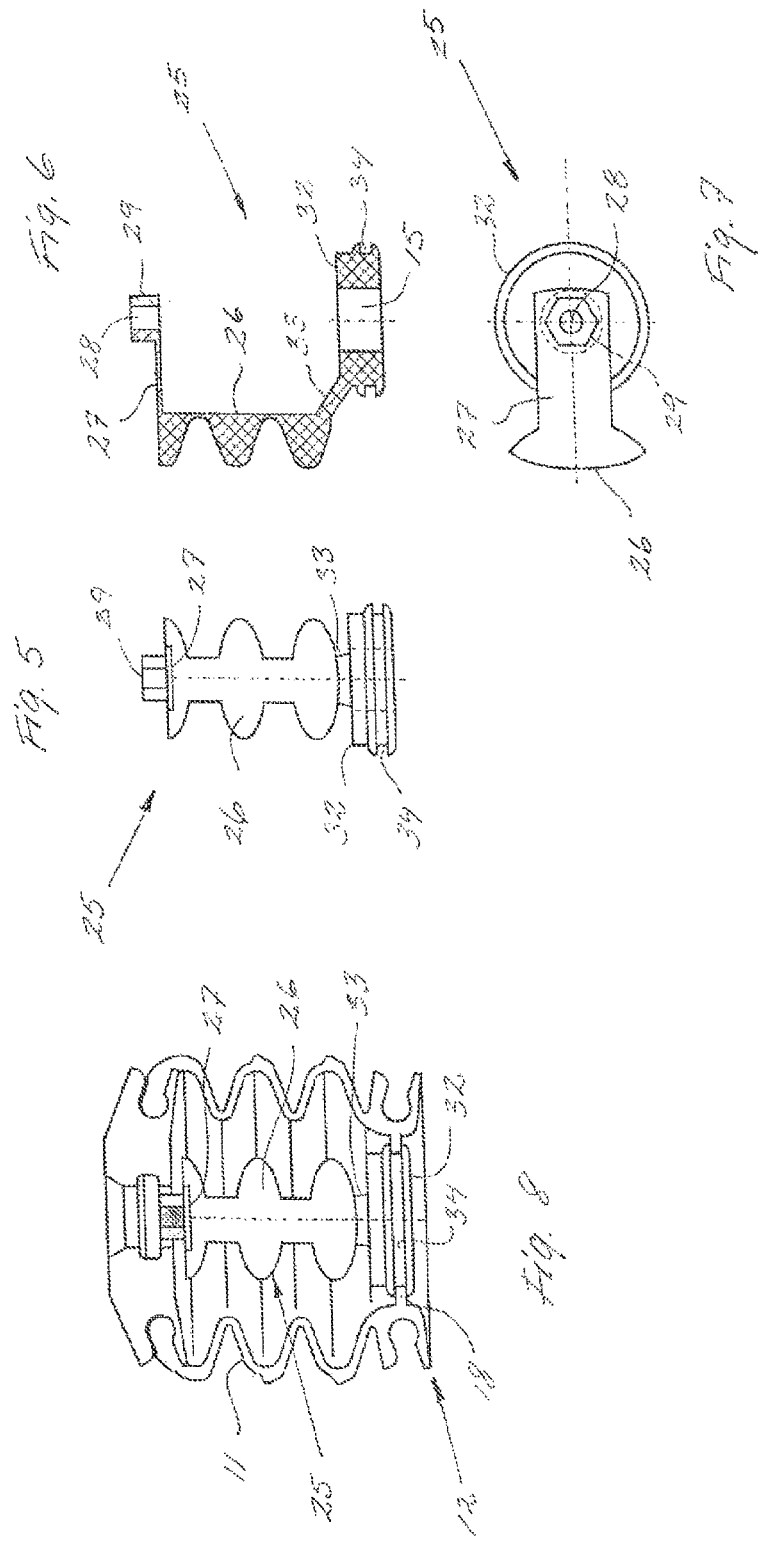

INSERT FOR BELLOWS WITH NON-LINEAR COMPRESSION / EXPANSION IN A VACUUM POWERED TOOL

TECHNICAL FIELD

The invention relates generally to vacuum powered tools. More precisely, the invention relates to a vacuum powered tool having a bellows that is connectable to a vacuum source and arranged to be compressed in its longitudinal direction as a result of a negative pressure in the bellows as well as to resiliently return to the original length when the negative pressure ceases. In an additional aspect, the invention relates to a bellows insert that is separately introducible into a bellows for vacuum powered tools.

BACKGROUND AND PRIOR ART

Vacuum powered tools are supplied with negative pressure from a vacuum source, which may be an ejector arranged adjacent to the tool or a centrally arranged ejector or pump that serves several gripping appliances. An appliance, such as a suction cup, can be connected to the vacuum source in order to, by suction effect, generate an engagement with objects that are to be handled by the vacuum powered tool.

In vacuum powered tools that are employed for the handling of objects having uneven or leaning surfaces, the suction cup can be formed as a bellows. The flexibility and compression capacity of the bellows allow an adaptation to the shape or position of the object so that the requisite sealing can be obtained between the object and the bellows, or between the object and an appliance coupled to the bellows such as a suction cup. The flexibility of the bellows is also advantageous in the handling of sensitive or deformable surfaces and materials, and therefore the bellows is an often utilized component in vacuum powered tools.

Bellows for this purpose can be manufactured of rubber or of synthetic rubber mixings and have most often a circular cross-section, but could have a polygonal cross-section. Typically, the bellows have a uniform diameter size that is made up by the external periphery of a number of plate-shaped rings piled on each other, which form a tooth-shaped or sinusoidal profile in a longitudinal cross-section. The bellows are torsion resistant as a result of their structure, but are otherwise universally flexible. However, upon the introduction of negative pressure in the bellows, the bellows typically undergoes an essentially rectilinear axial compression, so as to, when the negative pressure ceases, return to its original shape by an inherent spring force that aims to bring back the bellows to its original length.

Vacuum powered tools that are arranged with bellows are often employed for the sorting or picking of articles and packages. Various types of articles and packages are, however, not equally suitable to be gripped by means of negative pressure and by a suction effect. Accordingly, change from a hard package to a soft one may entail that the bellows and/or an appliance connected to the bellows has to be replaced by an appliance that exercises another form of engagement, such as pinching, clamping, locking, etc.

SUMMARY OF THE INVENTION

By the invention, a vacuum powered tool is provided that can be arranged with a bellows that is particularly formed to extend the applicability and capacity of the vacuum powered tool to handle also such objects or packages that are not suitable to be gripped by suction effect.

The object is fulfilled in a vacuum powered tool comprising a bellows connectable to a vacuum source, which bellows is arranged to be compressed in its longitudinal direction as a result of a negative pressure in the bellows as well as to resiliently return to the original length when the negative pressure ceases, and having an attachment arranged in a free end of the bellows for an appliance. The compression capacity of the bellows is locally limited whereby the bellows at negative pressure is forced to undergo a controlled non-linear compression by which the appliance attachment, as well as an appliance mounted in the attachment, if any, is driven in a laterally directed stroke movement By this solution, there is gained a simple adjustment of an existing tool upon alternation between different types of handled objects requiring different types of engagements from the appliance.

The solution may be applied by utilizing bellows that have a circular cross-section, wherein some or all of the pleats of the bellows are mutually fixed against compression within an angle interval of the cross-section.

The solution may just as well be applied by utilizing bellows that have a polygonal cross-section, wherein some or all of the pleats of the bellows are mutually fixed against compression in at least one side of the bellows.

In both cases, the pleats of the bellows may be mutually fixed against compression within a limited area of the circumference of the bellows by a filling of the bellows pleats that is fixedly anchored or integratedly formed in the bellows.

Said filling is preferably attached to the inside of the bellows, but may alternatively be attached to the outside of the bellows.

Alternatively, the pleats of the bellows may be mutually fixed against compression within a limited area of the circumference of the bellows by means of a separate insert that is introducible into the bellows and formed to be mountable and dismountable without damage on the bellows. The insert has a shape complementary to the inside of the bellows and fills up the pleats of the bellows in its mounted position inside the bellows. The insert is preferably rotationally fixedly mountable inside the bellows. According to this solution, the vacuum powered device can be readjusted for an alternative mode of operation without the bellows needing to be dismounted from the device.

The appliance attachment in the free end of the bellows is formed for a leakage-proof mounting of an appliance. The attachment of the appliance in the bellows may, for example, comprise a sealing screw joint or snap-in connection between the appliance and an end wall tightly connecting to the bellows. In this case, the appliance attachment may comprise an opening going through the end wall, which may be made with an internal thread for the screwing-in of the appliance in the end wall.

In a preferred embodiment, the bellows is arranged with an attachment for an arm protruding from the free end of the bellows, with an shock, gripping or clamping implement arranged in a free end of the arm. Said implement may be given varying design for different types of action on the handled object.

As an example, an embodiment may be mentioned wherein the arm, in its free end, supports a friction element in applications that include clamping against the outside or against the inside of an object. In another embodiment, the arm may, in its free end, support a claw in applications that include catching or holding of an object. A third embodiment example includes an arm having a through channel, which mouths in a suction cup carried in the free end of the arm, in applications wherein engagement by suction effect is to be established, for example with a transverse surface of the handled object.

The invention may advantageously be realised in an embodiment wherein two or more bellows are arranged and oriented in order to, in compression, drive their respective appliances in stroke movements directed against each other, or directed from each other. In doing so, the movements of the appliances are suitably co-ordinated to occur simultaneously or in sequence by common or individual control of the negative pressure introduced into the bellows.

In an additional aspect of the invention, the object is fulfilled by an insert that is mountable inside a bellows for a vacuum powered tool and, in the mounted position, effective to locally limit the capacity of the bellows of compression in its longitudinal direction caused by a negative pressure introduced into the bellows. An engagement part included in the bellows insert has a shape that is complementary to the inside of the bellows and, in the mounted position of the bellows insert, fills up some or all of the pleats of the bellows, within a limited area of the circumference of the bellows.

Said engagement part extends between a first and a second end, and comprises, in the first end, a member for rotational fixation of the bellows insert in relation to the bellows. The fixing member comprises a pin that is formed with a through channel and, in the mounted position of the bellows insert, formed to be rotationally fixedly received in a vacuum connection implement engaging the bellows. The pin is carried in the centre of the bellows by a bendable and resilient tongue projecting inward from the first end of the engagement part.

In the second end, the engagement part of the bellows insert comprises a member for the axial anchorage of the bellows insert in relation to the bellows. Said anchorage member comprises a stiff plate that is coupleable to the free end of the bellows and, via a bendable and resilient hinge, connects to the second end of the engagement part. The plate has an attachment for the mounting of an appliance in the bellows insert. Attachments may have a through channel for the supply of negative pressure to an appliance mounted in the attachment.

In a longitudinal cross-section, the engagement part of the bellows insert has a preferably continuous toothed, or sinusoidal, outside.

In a cross-section, the engagement part of the bellows insert has a partly circular outside adapted to the inside of a bellows having a circular cross-section, or, alternatively, a straight outside adapted to the inside of a bellows having a polygonal cross-section.

The bellows insert is preferably made of a castable material, such as a thermoplastic synthetic material, and moulded integrally.

Embodiments accounted for above of details in the solution can be utilized in different mutual combinations for the adaptation of an existing tool to varying needs and for different types of actions on objects to be handled.

BRIEF DESCRIPTION OF THE DRAWINGS

Embodiment examples of the invention are explained in more detail below, reference being made to accompanying schematic drawings. In the drawings FIG. 1 shows a vacuum powered tool including a bellows acting according to prior art;

FIG. 2 shows a vacuum powered tool according to the invention comprising a bellows having controlled non-linear compression;

FIGS. 4A-4G show a compilation of a number of appliances formed to be employed in a vacuum powered tool according to the invention;

FIG. 5 shows a side view of a separate insert for a bellows in a vacuum powered tool according to the invention;

FIG. 6 shows a cross-section through the bellows insert in FIG. 5;

FIG. 7 shows an end view of the upper end of the bellows insert according to FIGS. 5 and 6, and;

FIG. 8 shows a cross-section through a bellows having a mounted bellows insert.

DETAILED DESCRIPTION OF PREFERRED EMBODIMENT EXAMPLES

Figure 3A:
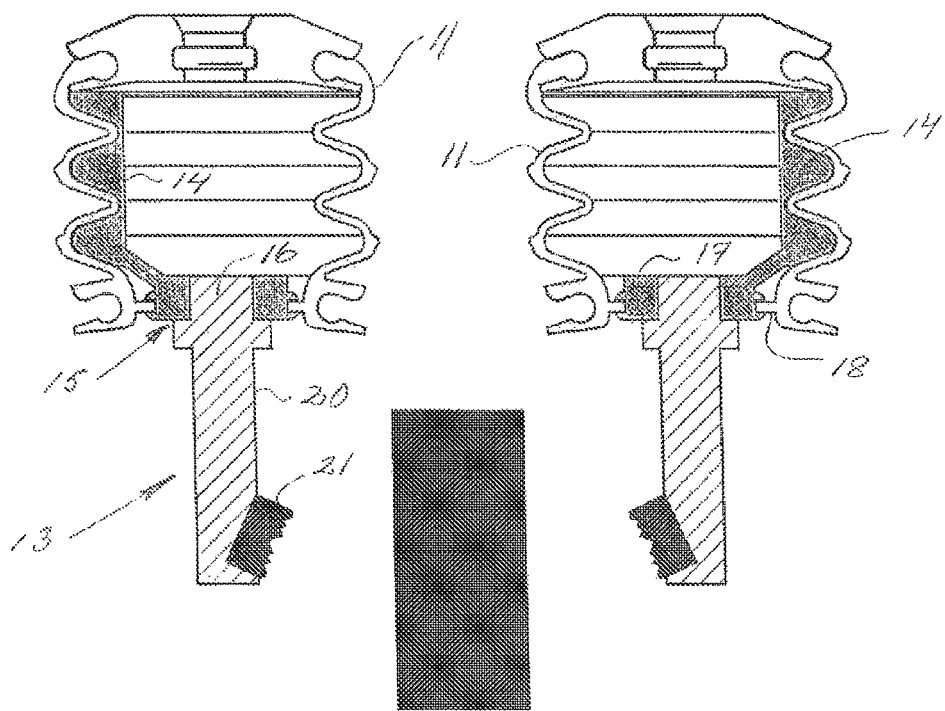
FIGS. 3A and 3B show cross-sections through an alternative setup of a vacuum powered tool according to the invention, having bellows in position of rest (3A) and in working position (3B), respectively.

In FIG. 1, there is illustrated the typical mode of operation well known to a person skilled in the art of a conventional bellows in a vacuum powered tool generally designated by the reference numeral 1.

The bellows 2 is carried by a holder 3, which in itself usually is movable and controlled to act on an object gripped by the bellows. To the holder, a vacuum source is connected, from where negative pressure can be introduced into the bellows via an opening in the coupled end of the bellows. The vacuum source may be an ejector 4 integrated in the holder, but may alternatively be a pump or ejector that is placed outside the holder and from which negative pressure is led up to the bellows via a pipe. The free end of the bellows may be formed with a sealing ring 5 for air-proof contact with the surface of an object. The sealing ring 5 may be integrated in the bellows or be a separate ring or suction cup coupleable to the bellows.

By a solid line, a state is shown in FIG. 1, wherein a negative pressure introduced into the bellows has caused an essentially rectilinear compression of the bellows (a gripped object has been excluded for reasons of clarity). By a dashed line, a state is shown wherein the bellows has expanded to its original shape and normal pressure prevails inside the bellows, in the position of rest of the bellows.

No further explanation of the structure of a bellows beyond what has been described initially is required for a person skilled in the art to understand the invention.

In FIG. 2, a vacuum powered tool 10 is shown arranged according to the invention with a bellows 11, the mode of operation of which differs from the one of the conventional bellows. The position of rest of the bellows 11 is once again shown by a dashed line, while the compressed position of the bellows is shown by a solid line. As seen in FIG. 2, a negative pressure introduced into the bellows 11 causes that the bellows undergoes a non-linear compression, during which the free end 12 of the bellows is driven in a stroke movement S directed sidewards and from a geometrical centre line CL. The measures in the bellows 11 that enforce a controlled non-linear compression of the bellows are explained in more detail below, reference being made to FIG. 3.

Figure 3B:
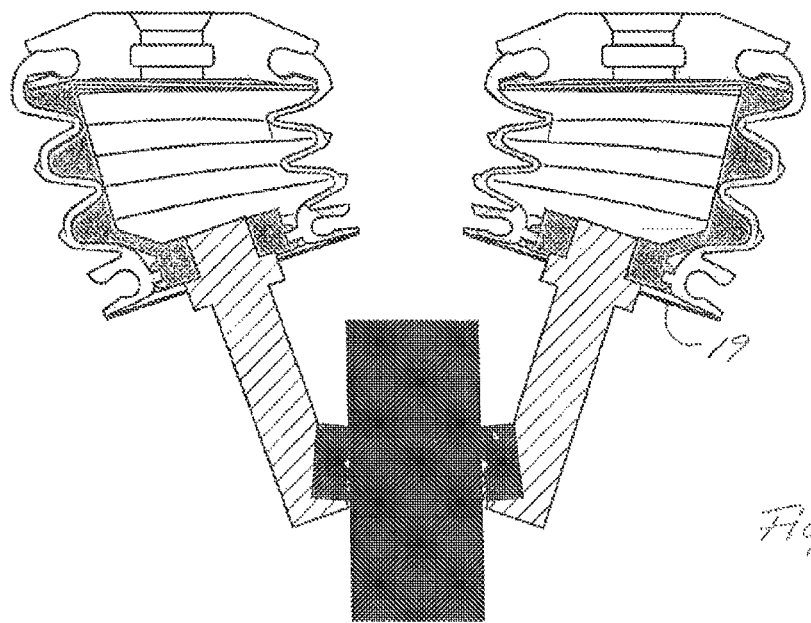

FIG. 3 shows a vacuum powered tool wherein two bellows 11 are arranged for co-operation. More precisely, FIG. 3A shows the position of rest of the bellows and FIG. 3B the compressed state or working position of the bellows, in which the bellows 11 provide a two-sided engagement with an object that is clamped between appliances 13 mounted in the free end of the respective bellows.

The controlled non-linear compression characterizing the bellows 11 is provided by a filling 14 of the bellows pleats that is attached or integratedly formed in the bellows. This filling 14 provides a mutual fixation of the pleats of the bellows and prevents efficiently an axial compression of the bellows in a limited area of the circumference of the bellows. In each individual case, the extension of the filling in the circumferential direction of the bellows has to be adapted to the inherent elasticity of the bellows material and the flexibility of the bellows. As a guideline value, it could be assumed that the filling covers at most 90° of the cross-section of a bellows of a circular cross-section, and that its extension preferably amounts to an angle interval of approx. 30-60°. In other words, at negative pressure in the bellows, the filling causes the resulting compression to be concentrated to the opposite side of the bellows, where the impact of the filling on the compression capacity of the bellows is minimal or non-existent. Since the possible reduction of the inner volume of the bellows simultaneously is limited, a volume-wise smaller evacuation is required to achieve a maximum compression of the bellows 11, which can be utilized to bring about a comparatively quick movement of an appliance mounted in the bellows, if any.

A corresponding filling may alternatively be located to the outside of the bellows and arranged as a complete filling of the space between the pleats of the bellows. A filling may alternatively be located to the outside of the bellows and arranged to mutually fix the peripheries of the bellows pleats, and in that connection only partly fill up the space between the pleats of the bellows. Preferably, the filling 14 is, however, attached to the inside of the bellows. In all cases, the filling may be integratedly formed in the manufacture of the bellows.

An advantageous embodiment of the filling 14 includes a separate insert that is introducible into the bellows and can be mounted and dismounted without additional measures in the bellows. Such a bellows insert will be described in more detail below, reference being made to FIGS. 5-8.

The non-linear compression of the bellows 11 is employed for the movement of an appliance 13, refer again to FIGS. 3A and 3B. The appliance 13 is mountable in the free end of the bellows, which for the purpose has an appliance attachment 15. The appliance attachment 15 is formed to provide an air-proof mounting of the appliance 13 in the bellows 11 so that surrounding air is not sucked in when negative pressure prevails inside the bellows. In the embodiment example in FIG. 3, the appliance attachment 15 is made as an internally threaded hole in which a threaded end 16 of the appliance can be tightened. A sealing ring (not shown in the drawing figures) may, where appropriate, be attached between the appliance and the appliance attachment. Said hole is recessed in an end plate 17, which has a circumferential groove in which a flange 18, formed on the inside of the free end of the bellows, is received in an air-proof way. A collar 19 (FIG. 3B) fixedly anchored or formed on the appliance may, where appropriate, be arranged to abut against the end of the bellows and provide increased stability of the joint between the appliance and bellows.

In the mounted position, the appliance 13 extends in the longitudinal direction of the bellows in the form of an arm 20. In the free end of the arm, a member is carried the shape of which may vary in respect of which type of engagement with the handled object is suitable. In the embodiment example in FIGS. 3A and 3B, the member is realized in the form of a plate 21 that is secured to the arm and has knurls for increased friction and a better grip when the appliances 13 are driven, in mutually opposite directions, for the clamping of an object between the plates 21.

With reference to FIGS. 4A-4G, there are shown further examples of appliances formed to utilize the stroke movement that is provided by the non-linear compression of the bellows.

Accordingly, FIGS. 4A-4E show alternative embodiments of appliances formed as shock, clamping or gripping implements and having lips (4A), scoops (4B) or claws (4C) suitably shaped for the purpose, while FIG. 4F and FIG. 4G show appliances formed to grip an object by suction effect. More precisely, the appliance according to FIGS. 4F and 4G is made as an arm 20 having a through channel 22, which mouths in a suction cup 23 carried in the end of the arm. A fixed restriction 24 in the channel guarantees that the bellows first is compressed and brings the suction cup into abutment against the object, whereupon the falling pressure in the bellows brings about evacuation of the air inside the suction cup.

In a vacuum powered tool according to the invention, two or more bellows 11 may be co-ordinated to drive the respective appliance, simultaneously or in sequence, by a common or individual control of the negative pressure introduced into the bellows.

Even if FIGS. 3A and 3B show a device wherein two bellows 11 are arranged and oriented in order to, in compression, drive their respective appliances in stroke movements directed against each other for engaging the outside of an object, it is appreciated that the bellows alternatively can be rotated at 180° to drive the appliances in movements directed from each other, for engaging the inside of a hollow object.

Among other feasible combinations of co-operating bellows, one embodiment may be mentioned (not shown in the drawings) wherein three bellows are arranged in a triangle having a mutual angular distance of 120°. The three bellows can be oriented to turn their attached appliances outward or inward toward a centre. The appliances may be made as scoops (FIG. 4B) for forming, in the turned-in position, a bowl, which from below grips an egg-shaped or spherical object.

With reference to FIGS. 5-8, now a separate insert that is introducible into a conventional bellows will be described, which, in the introduced position, enforces a controlled non-linear compression of the bellows when negative pressure is introduced into the bellows.

The bellows insert 25 comprises an engagement part 26 that, in a mounted position, is formed to run along the inside of the bellows. The engagement part 26 has a shape complementary to the inside of the bellows and fills, in the mounted position, up the space between the pleats of the bellows. The outside of the engagement part may be sinusoidal in the way shown in FIG. 6, but may alternatively have another shape adapted to the inside of the bellows.

In the mounted position, the bellows insert 25 is formed to be rotationally fixedly anchored in relation to the bellows. For the purpose, the bellows insert has a fixing member arranged in a first end of the engagement part, and more precisely carried in a bendable and resilient tongue 27 that projects from said first end and holds the fixing member in a centred position in the bellows. The fixing member may be a pin 29 that is formed with a through channel 28 and arranged to, in the mounted position of the bellows insert, be introduced in a connection implement 30 (FIG. 2) by which the bellows is coupled to the holder 3 and is put in communication with the vacuum source. Such a vacuum connection implement typically has a channel 31 whereby negative pressure is led into the bellows. Therefore, a rotationally fixed engagement with the bellows insert may, for example, be realised by the pin 29 and said channel 31 through the connection implement having a shape that prevents mutual rotation. The outside of the pin may, for example, be formed as a nut, while the channel of the vacuum connection implement is formed for the introduction of a hex head wrench.

The bellows insert 25 is furthermore formed to be anchored in an air-proof way at the free end of the bellows. For this purpose, the bellows insert has an anchorage member in the form of a stiff plate 32 that is coupleable to the free end of the bellows and, via a bendable and resilient hinge 33, connects to a second end of the engagement part 26. The plate 32 may, in the way described above, comprise a circumferential groove 34 by which the bellows insert can be coupled to a flange 18 (FIG. 8) projecting inward from the inside of the bellows. In the plate 32, an attachment 15 for appliances is arranged in the way described above.

It will be appreciated that the invention provides flexibility by allowing simple adjustment of an existing installation to varying needs. It should also be appreciated that the invention may be modified in respect of detailed design of elements included in the embodiment examples accounted for without deviating from the fundamental solution and the general idea of the invention defined in the attached claims.

The invention claimed is:

1. Bellows insert (25) mountable inside a bellows for a vacuum powered tool and, in the mounted position, effective to locally limit the capacity of the bellows of compression in its longitudinal direction caused by a negative pressure introduced into the bellows, which bellows insert comprises an engagement part (26) that has a shape complementary to the inside of the bellows and that, in the mounted position of the bellows insert, fills up some or all of the pleats of the bellows, within a limited area of the circumference of the bellows, wherein the engagement part (26) extends between a first and a second end, characterized in that the engagement part (26), in said first end, has a fixing member (29) for rotational fixation of the bellows insert in relation to the bellows, said fixing member comprising a pin (29) that is formed with a through channel (28) and, in the mounted position of the bellows insert, formed to be rotationally fixedly received in a vacuum connection implement engaging the bellows.

2. Bellows insert according to claim 1, wherein the pin (29) is carried in the centre of the bellows by a bendable and resilient tongue (27) projecting inward from the first end of the engagement part (26).

3. Bellows insert according to claim 2, wherein the engagement part (26), in said second end, comprises an anchorage member (32) for the axial anchorage of the bellows insert in relation to the bellows in the form of a stiff plate (32) that is coupleable to the free end of the bellows and, via a bendable and resilient hinge (33), connects to the second end of the engagement part (26).

4. Bellows insert according to claim 1, wherein the engagement part (26), in said second end, comprises an anchorage member (32) for the axial anchorage of the bellows insert in relation to the bellows in the form of a stiff plate (32) that is coupleable to the free end of the bellows and, via a bendable and resilient hinge (33), connects to the second end of the engagement part (26).

5. Bellows insert according to claim 4, wherein the plate (32) has an attachment (15) for the mounting of an appliance in the bellows insert.

6. Bellows insert according to claim 5, wherein the attachment (15) has a through channel for the supply of negative pressure to the appliance.

7. Bellows insert according to claim 1, wherein the engagement part (26), in a longitudinal cross-section, has a continuous toothed or sinusoidal outside.

8. Bellows insert according to claim 1, wherein the engagement part (26), in a cross-section, has a partly circular outside adapted to the inside of a bellows having a circular cross-section.

9. Bellows insert according to claim 1, wherein the engagement part (26), in a cross-section, has a straight outside adapted to the inside of a bellows having a polygonal cross-section.

10. Bellows insert according to claim 1, formed integrally by casting.

* * * * *

UNITED STATES PATENT AND TRADEMARK OFFICE
CERTIFICATE OF CORRECTION

| | |
|---|---|
| PATENT NO. | : 9,046,177 B2 |
| APPLICATION NO. | : 14/241180 |
| DATED | : June 2, 2015 |
| INVENTOR(S) | : Peter Tell |

It is certified that error appears in the above-identified patent and that said Letters Patent is hereby corrected as shown below:

On the title page, insert Item (30)

-- Foreign Application Priority Data

October 25, 2011 (SE).......................................1150984-1 --

Signed and Sealed this
Ninth Day of February, 2016

Michelle K. Lee
*Director of the United States Patent and Trademark Office*